March 3, 1970     W. J. TIMSON     3,498,454

COUNTER-CURRENT CENTRIFUGAL DEVICE AND USE

Filed Feb. 20, 1968

INVENTOR
William J. Timson
BY Brown and Mikulka
ATTORNEYS

United States Patent Office 3,498,454
Patented Mar. 3, 1970

---

3,498,454
COUNTER-CURRENT CENTRIFUGAL DEVICE AND USE
William J. Timson, Belmont, Mass., assignor to Polaroid Corporation, Cambridge, Mass., a corporation of Delaware
Filed Feb. 20, 1968, Ser. No. 706,987
Int. Cl. B07b *7/00*
U.S. Cl. 209—144                                    13 Claims

ABSTRACT OF THE DISCLOSURE

An apparatus which includes a housing defining a chamber therein, at least two rotatable plates in spaced, face-to-face relationship defining a channel therebetween; at least one inlet for feeding fluid material into the channel; a plurality of spaced outlets for removing the processed material, at least one of which is spaced radially from the center of rotation of the plates. A counter-current flow pattern is provided by introducing a displacement fluid into the channel. Preferably, the plates are mounted on separate rotatable shafts and the inlet for material to be processed is through one shaft and one outlet is in the other shaft. The apparatus can be used as a classifier, concentrator, emulsifier or for washing materials of different density or the same density and different mass.

---

This invention relates to an improved counter-current, centrifugal exchange device and to the method of separating materials of different densities or materials of the same density and different mass.

Counter-current, centrifugal exchange devices have been known in the past. However, such devices were deficient in that they were limited with regard to the materials that could be processed therein or did not possess sufficient flexibility with regard to the type of processing operations they could undertake. For example, U.S. Patent No. 2,758,783, issued Aug. 14, 1956, to Walter J. Podbielniak is directed to an apparatus for counter-current exchange which comprises a rotor chamber and a rotor mounted on a rotatable shaft and carrying a plurality of concentric perforated bands. Such a device, however, is limited to liquid systems and cannot be used for systems containing suspended solids or particulate matter because of the tendency of the perforations in the band to clog with the solid material.

A device has now been found which is not susceptible to the deficiencies of the prior art.

Figure 1:
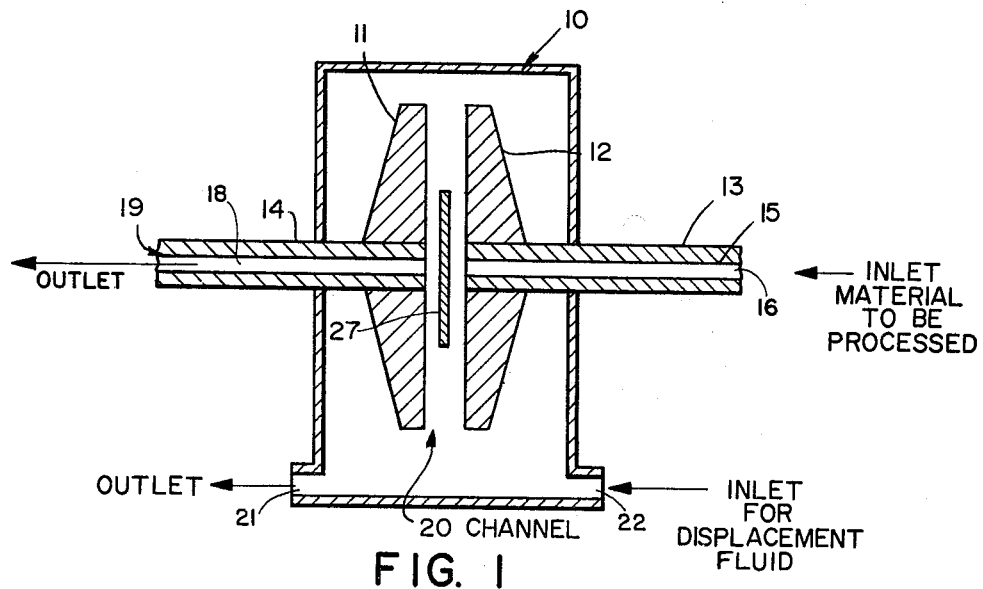
Figure 2:
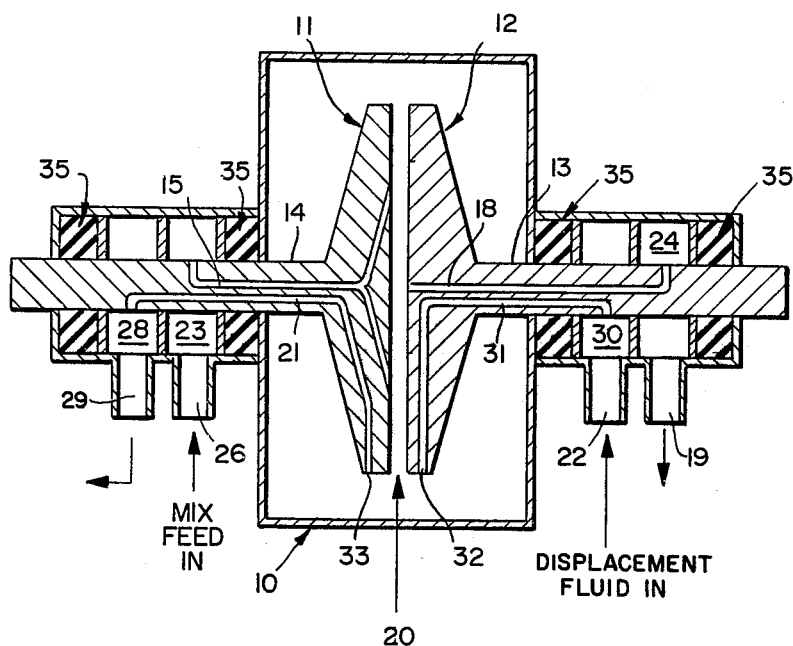

In the drawings:
FIG. 1 is a longitudinal section through the novel apparatus illustratiing the general construction thereof;
FIG. 2 is a longitudinal section illustrating a particularly preferred embodiment of the novel apparatus of the present invention.

The novel apparatus of the present invention comprises a housing defining a chamber which contains at least a first and second rotatable plate or disc mounted therein in face-to-face spaced relationship and defining a channel therebetween. The plates are preferably mounted on shafts. Inlet means are provided for introducing the material to be processed into the channel. Outlets for removing processed material are provided with at least one outlet spaced radially from the center of rotation of the plates. Preferably, material to be processed is introduced into the space between the plates near the shaft, that is, near the center of rotation of the plates. An outlet for the processed material of lower density or mass is also preferably located in proximity to one of the shafts. Baffle means, or distribution means are employed, to aid the distribtuion or to prevent a direct flow of the material to be processed through the housing from the inlet to the outlet without being processed by the centrifugal forces set up by the rotation of the plates. Counter-current force is applied to the material in the housing by the introduction of a fluid from a point spaced apart from the center of rotation of the plates. An outlet for the material of greater density or mass is located spaced apart from the center of rotation of the plates since this material will be forced towards the periphery of the plates and toward the housing walls by the centrifugal force exerted by the rotating plates. The inlet for a displacement fluid or washing fluid to provide the counter-current flow is preferably located in the wall of the housing. In still another alternative embodiment, baffles are provided on the housing walls to prevent channeling, to provide uniform turbulent flow in the housing and to prevent rotation of the fluid. If desired, filtering means are employed in conjunction with the outlets or inlets to provide still further classification of materials.

In employing the novel apparatus of the present invention, the fluid material to be processed is introduced into the housing into the space or channel between the plates. The inlet, which is located close to, or preferably through a hollow shaft, i.e., at or near the center of rotation, introduces the material into rotating channel formed by the rotation of the plates where it is subject to the centrifugal and counter-current forces. Also in close proximity to a shaft is an outlet for the material of lower density. The channel is preferably baffled to prevent the direct passage of the material through the housing without undergoing the action of the centrifugal force and counter-current treatment in the channel between the plates.

If desired, the devices are operated in series or in various combinations, for example, with the exit stream from one device feeding into the inlet of another to provide any combination of separation, washing, or classification operations.

The action of the rotating plates sets up a centrifugal force which drives the materials of greater density or mass toward the periphery of the plates and the walls of the housing while the material of lesser density or mass move as a result of the counter-current flow pattern provided by the introduction of a fluid into the chamber from a point spaced apart from the center of rotation, toward the center of the plates, i.e. the center of rotation where the centrifugal force is minimal. The less dense material or smaller particle size material, as stated above, is preferably drawn off from a point near the shaft or through the shaft, while the material of greater density is drawn off from an outlet in the housing wall near the periphery of the plates. Preferably, an inlet is located in the housing wall near the periphery of the plate to provide for the insertion of displacement or washing fluid into the housing, which provides counter-current action to drive the material of lesser density or mass towards the center of rotation.

The degree of rotation of the plates is selected with regard to the speed with which the materials are to be separated and the composition of the material introduced into the apparatus. The plates may be rotated in the same or in opposite directions; preferably the rotation is in the same direction. In a particularly preferred embodiment, the plates are rotated at slightly different speeds in the same direction, thereby providing the material in the channel between the plates with a shearing effect which results in the stabilization of the counter-current flow pattern and increases the mass transfer by decreasing the diffusion barrier. If the plates are rotating in the opposite direction, a differential in the rotational speed is necessary to provide the centrifugal force.

As stated above, the outlet for the material of greater density or mass is preferably located in the periphery of one or more of the plates or in the wall of the housing; that is, in the area of the greater concentration of material driven outward by the centrifugal force. In an alternative embodiment, a hollow or channeled plate is employed with ports located at varying spaced positions on the face of said plate whereby material of varying density or particle size fractions can be removed from the apparatus to provide narrow band separation. In still another embodiment, a series of ports of different cross sections can be located in the periphery of the plate.

In employing plates with a series of ports on the face thereof for the removal of various fractions, sections of the face of the plates can be parabolic to provide a predetermined balance of flow rate to centrifugal force at various points along the face of the plate so that material of a specific density or mass would stop its outward movement at a pre-selected point along the face of the plate and remain suspended at this particular point, thereby permitting the removal of this particular fraction through the aforementioned ports. It is preferred however, that the face of the plates be flat.

The spacing of the plates, i.e. the width of the channel, is not critical and can range from the size of the largest particle of material to be processed to a spacing many multiples of the particle size. The selection of the particular spacing is, therefore, determined by the material to be processed and the desired speed with which the separation or other procedure is accomplished.

The length of the channel, that is the distance from the center of the plate to the periphery (the radius of the disc), is preferably as short as possible in order to provide the maximum speed of passage of the materials toward the housing wall. In one example, an apparatus of the present invention having a channel 1 centimeter long with a spacing between the plates of 0.2 centimeter was able to separate particular matter in a fluid to an accuracy of $\pm 0.1$ micron in diameter, where the particle size ranged from 0.4 to 3.0 microns in the material introduced into the channel.

Referring now to the drawings, FIG. 1 shows housing 10 having mounted therein plates 11 and 12 mounted on rotatable shafts 13 and 14; said plates being spaced apart and defining channel 20 therebetween. The material to be processed is introuced into the apparatus through conduit 15 and inlet 16 and distributed by baffle 27 into channel 20. The centrifugal and counter-current forces exerted on the material in channel 20 directs the material of greater density or mass away from the center of the plates and toward the outer walls of the housing, from which it is removed from the apparatus through outlet 21. Inlet 22 in the housing wall provides means for introducing a washing or displacement fluid into the housing to provide counter-current forces and to also facilitate the removal of the higher density material through outlet 21. The lower density or mass material passes through conduit 18 in shaft 14 and is removed from the apparatus through outlet 19.

FIG. 2 illustrates a particularly preferred arrangement of the inlets and outlets in the apparatus in the present invention which provides greater equalization of the pressures of the entering and exiting streams of the material. In the arrangement shown in FIG. 2, the flow control of the streams is greatly simplified.

Turning now to the drawing, housing 10 contains two plates, 11 and 12, mounted on rotatable shafts 13 and 14 and defines channel 20 therebetween. The material to be processed is introduced through inlet 26 into chamber 23 and then through conduit 15 to channel 20 where it is distributed. The material of greater density or mass which is forced toward the outer periphery of plates is removed through outlet 33 into channel 21 to chamber 28 from whence it is removed from the apparatus through outlet 29. The displacement fluid, such as wash water, is introduced into the apparatus at the periphery of plate 12 through inlet 32 from conduit 31. The displacement fluid is provided to the apparatus through inlet 22 into chamber 30 from where it is introuced into conduit 31. The material of lesser density is removed by conduit 18 located near the center of plate 12 into chamber 24 and leaves the apparatus through outlet 19. Suitable seals 35 to provide mounting for the shaft and separation of the various chambers are shown. Drive means for the shaft which are not shown, are also provided.

The novel apparatus of the present invention may be employed for a variety of processing applications. As described above it may be employed for separating materials of different densities or masses. The material to be processed is introduced into the channel between the plates at a point near the center of the plate and a first outlet means is provided near the center of the plate or through the shaft for the material of lesser density or mass and a second outlet spaced away from the center of rotation of the plates, preferably in the periphery of the plates or in the wall of the housing, provides for the removal of material of greater density or mass which moves away from the center of rotation as a result of the centrifugal action set up by the rotation of the plates. Counter-current action is provided by the displacement fluid, such as wash water, which is introduced into the housing from a point in the wall of the housing.

In alternative embodiments, various combinations of open and closed inlets and outlets can be employed to provide a variety of effects. A gross separation of materials can be achieved by closing the inlet for the displacement fluid and also closing the outlet spaced apart from the center of rotation to provide removal of smaller particles and retention of the larger particles in the apparatus.

The apparatus is also employed as a concentrator wherein only the liquid is removed. For example, the novel apparatus of the present invention has especial utility in separating insoluble salt in fluids by removal of the liquid alone while the salts are concentrated within the housing. Material is fed at a relatively slow rate so that all the particulate material will move away from the outlet in the shaft. When the concentration of the particulate salt reaches a point wherein the efficiency of the apparatus is substantially decreased a port in the wall of the housing may be opened to bleed-off the relatively high concentration of the particulate matter.

In still another embodiment the novel apparatus may be employed as an emulsifier by the introduction of material to be emulsified into the channel and then closing all of the inlet and outlet ports in the apparatus. The transverse shear set up by the rotating plates would provide the emulsification action. In this matter the novel apparatus can also be employed as a colloid mill. As an illustrative example, the rotation of one plate at 5,000 r.p.m. and the second plate at 25,000 r.p.m. will provide a colloid having a particle of less than micron size.

The novel apparatus of the present invention possesses great utility for a broad spectrum of counter-current mass transfer operations involving (a) solid-liquid systems, (b) liquid-liquid systems and (c) gas liquid systems and combinations thereof.

The apparatus can process materials of different densities, or the materials of the same density and different masses. Unlike prior art devices, the apparatus processes sticky and hard to handle materials with ease since there are no small passages or perforations in bands which can plug or otherwise become fouled. The combined centrifugal and counter-current action provides a cleaning operation during the processing.

The novel apparatus of the present invention is particularly useful in processing silver-halide-gelatin photographic emulsions. The apparatus is employed to perform a variety of processing operations on the emulsion. For example, efficient washing of flocculated emulsions may be achieved; emulsion grains may be classified into desired distribution ranges; silver halide grains may be concentrated into a smaller volume of fluid and the continuous phase of an emulsion may be displaced by a second continuous phase.

As illustrative of the novel process of the present invention the classification of a photographic emulsion into the desired particle size range is described. The emulsion to be treated is introduced into the channel between the rotating plates. The centrifugal force drives the larger, coarser particle fraction of the emulsion toward the outer periphery of the plate where it leaves the apparatus by an appropriate exit passage located near the periphery of the plate either in the wall of the housing or in the plate itself. The removal of the coarser particle size material is facilitated by the introduction of distilled water as a wash liquid into the area of the greater concentration of the coarse material. The finer particle sizes emulsion material is displaced toward the center of the rotating discs by the counter-current flow and is removed from the rotation.

The following non-limiting example illustrates the employment of the novel apparatus of the present invention to separate a material according to particle size.

EXAMPLE

Employing an apparatus similar to that set forth in FIGURE 2, a conventional photographic silver halide gelatin emulsion, having a particle size distribution from about 0.4 to 3.0 microns (as determined by histogram), was introduced into the channel between two plates of 5" O.D. The dimensions of the channel were 1/16" wide by 1/2" long. The two plates were rotating in the same direction at a speed of 2,500 r.p.m. and 2,400 r.p.m., respectively. The material passing through the small particle outlet 18 in plate 12 was less than 1 micron in diameter. Particles having a diameter of one to two microns were removed continuously through outlet 33 in plate 11. Materials greater than 2 microns in diameter remained in the apparatus and were removed from time to time to prevent excessive build-up of the larger particle size in the apparatus.

The novel apparatus of the present invention is also of particular value in processing photographic silver halide-gelatin emulsions, in that the present invention provides a method by which unflocculated grains can be washed. In the past it was necessary to carry out the washing step for the removal of soluble salts, such as potassium nitrate, which are formed during the emulsion preparation, by treating a flocculated emulsion or noodling the emulsion. By means of the present invention, however, the individual grains can now be washed, thereby providing greater efficiency of salt removal, and emulsions with greater uniformity of particle size which has heretofore not been obtainable on a commercial scale.

By employing the novel apparatus of the present invention it is also possible to prepare a silver halide-gelatin emulsion and then replace the gelatin phase of the emulsion with another suspending polymer, such as polyvinyl alcohol. In such an exchange operation, the silver halide gelatin emulsion would be introduced into the channel between the rotating plates while at the same time polyvinyl alcohol would be introduced into the apparatus through an inlet in the housing. The centrifugal force and counter-current forces set up would be such that the gelatin would move to the center of the plates and be removed through the outlet in the shaft while the silver halide particulate matter would be driven toward the periphery of the rotating plates. Outlets for the particulate matter would be closed thereby retaining it in the housing during the exchange of the gelatin for the polyvinyl alcohol.

What is claimed is:
1. An apparatus which comprises:
   a housing defining a chamber therein;
   at least a first and second plate in opposed spaced relationship;
   said plates defining a channel therebetween, said channel being disposed in a radial direction;
   means for differentially rotating said plates;
   first means for introducing fluid material into said channel;
   a plurality of spaced outlet means for removing material, at least one of said outlet means being spaced radially from one other of said outlet means;
   and a second means for introducing fluid material.
2. The apparatus as defined in claim 1 wherein said first and said second plates are mounted on separate rotatable shafts.
3. The apparatus as defined in claim 2 wherein said means for introducing said fluid material and at least one of said outlet means for removing material are associated with said rotatable shafts.
4. The apparatus as defined in claim 1 which includes baffle means associated with said means for introducing fluid material to provide distribution of said material in said channel.
5. The apparatus as defined in claim 1 wherein one of said outlet means is located in the periphery of one of said plates.
6. The apparatus as defined in claim 1 including means for independently rotating said plates.
7. The apparatus as defined in claim 1 wherein said second means for introducing a fluid material is spaced radially from the center of rotation of said plates.
8. The apparatus as defined in claim 7 wherein said second means for introducing a fluid material is spaced radially from said first means for introducing a fluid material.
9. The apparatus as defined in claim 8 wherein said first means for introducing a fluid material is integral with said first plate and said second means for introducing a fluid material is integral with said second plate.
10. The process for the separation of materials into fractions with respect to density or mass which comprise the steps of introducing a first fluid material containing elements of different density or mass into a channel intermediate a first and second plate in face-to-face spaced relationship, said channel being disposed in a radial direction, differentially rotating said plates to provide a centrifugal force to said material in said channel, introducing a second fluid into said channel to provide a counter-current flow with respect to said centrifugal force, separating thereby said elements as a function of their density or mass, and collecting at least one fraction of said first material so separated.
11. The process as defined in claim 10 wherein a lower density or mass fraction is collected adjacent the center of rotation of said plates and a higher density or mass fraction is collected at a location spaced radially from said center of rotation.
12. The process as defined in claim 10 wherein said first material is photographic silver halide dispersed in a polymeric matrix.
13. The process as defined in claim 10 wherein the fluid for providing said counter-current flow is water.

(References on following page)

References Cited

UNITED STATES PATENTS

| | | | |
|---|---|---|---|
| 1,212,996 | 1/1917 | Parker | 55—17 |
| 2,199,015 | 4/1940 | Toensfeldt | 209—144 X |
| 2,276,761 | 3/1942 | Carey | 209—144 |
| 2,338,779 | 1/1944 | Mutch | 209—144 |
| 2,550,301 | 4/1951 | Scott | 241—251 X |
| 2,758,783 | 8/1956 | Podbielniak | 233—15 |
| 2,796,173 | 6/1957 | Payne et al. | 209—211 X |
| 3,048,271 | 8/1962 | Sharples | 209—144 |
| 3,089,595 | 5/1963 | Kaiser | 209—144 |
| 3,255,805 | 6/1966 | Bechard | 233—15 X |
| 3,273,807 | 9/1966 | Wright | 241—251 X |
| 3,371,782 | 3/1968 | Meyer et al. | 209—144 |
| 3,371,783 | 3/1968 | Meyer et al. | 209—144 |

TIM R. MILES, Primary Examiner

U.S. Cl. X.R.

55—17, 400; 209—148, 211; 233—15; 241—255